United States Patent

Beckham

[15] 3,694,433
[45] Sept. 26, 1972

[54] METHOD FOR THE RECOVERY OF CAPROLACTAM
[72] Inventor: Leland J. Beckham, Lutz, Fla.
[73] Assignee: Allied Chemical Corporation, New York, N.Y.
[22] Filed: Aug. 27, 1971
[21] Appl. No.: 175,740

[52] U.S. Cl. .............................................. 260/239.3 A
[51] Int. Cl. ............................................... C07d 41/06
[58] Field of Search .............................. 260/239.3 A

[56] References Cited

UNITED STATES PATENTS 3,264,060  8/1966  Nieswandt et al. ..260/239.3 A
3,336,298  8/1967  De Rooij............260/239.3 A

*Primary Examiner*—Henry R. Jiles
*Assistant Examiner*—Robert T. Bond
*Attorney*—Arthur J. Plantamura et al.

[57] ABSTRACT

A process comprising the steps of:

a. contacting at a temperature ranging from about 40° C. to about 90° C. a rearrangement mass comprising $\epsilon$-caprolactam and sulfuric acid with the following reactants:
   (i) substantially water-free ammonium sulfate in an amount ranging from about 0.9 to about 1.1 moles per mole of sulfuric acid present in said rearrangement mass, and
   (ii) an aqueous ammonium bisulfate solution saturated at a temperature within the range of 20° to 55° C., the amount of said aqueous solution being such as to dissolve at the contacting temperature the ammonium bisulfate formed by the reaction of the sulfuric acid component of the rearrangement mass with said ammonium sulfate, to thereby afford an $\epsilon$-caprolactam phase and an aqueous ammonium bisulfate phase;
b. separating said $\epsilon$-caprolactam phase;
c. cooling said aqueous ammonium bisulfate phase to a temperature within the range of 20° to 55° C. to thereby afford crystalline ammonium bisulfate and a saturated aqueous ammonium bisulfate solution;
d. recovering and recycling said saturated aqueous solution to step a).

5 Claims, No Drawings

METHOD FOR THE RECOVERY OF CAPROLACTAM

BACKGROUND OF THE INVENTION

The present invention relates to the recovery of caprolactam from a Beckmann rearrangement mass.

It is well known that lactams can be obtained by the Beckmann rearrangement of alicyclic oximes, the rearrangement normally being effected in a concentrated acid medium which is usually sulfuric acid or oleum. $\epsilon$-caprolactam is conventionally produced by reacting cyclohexanone with hydroxylamine to afford cyclohexanone oxime and then rearranging this oxime by contacting with oleum to afford $\epsilon$-caprolactam. In this procedure, the lactam formed is in the conjugated acid form admixed with sulfuric acid in a viscous, intractable, one-phase system generally referred to in the art as "rearrangement mass." To effect separation of the $\epsilon$-caprolactam, the rearrangement mass is usually contacted with sufficient aqueous ammonium hydroxide to neutralize the sulfuric acid component of the rearrangement mass, thereby affording aqueous ammonium sulfate solution as one phase and $\epsilon$-caprolactam as a second phase. Ammonium sulfate, although agronomically satisfactory as a fertilizer, is losing its share of this market to more concentrated sources of nitrogen, such as urea, which are less costly to ship. Production of large quantities of ammonium sulfate is therefore not desirable and can result in the accumulation of vast quantities of essentially unsaleable material which poses a problem of storage and, frequently, a pollution problem.

It has more recently been proposed (U.S. Pat. No. 3,336,298) to free $\epsilon$-caprolactam from the rearrangement mass by adding thereto aqueous ammonium sulfate wherein the mole ratio of ammonium sulfate to sulfuric acid is at least 0.75:1. The ammonium sulfate serves to convert the lactam from the conjugated acid form to the separated free base form. The sulfuric acid is simultaneously converted to ammonium bisulfate which retains the acid values thereof and can therefore be used for other purposes, e.g. in the extraction of phosphoric acid from phosphate rock. Alternately, the ammonium bisulfate can be pyrolyzed in accordance with the teaching of U.S. Pat. No. 3,282,646 or 3,383,170 to afford sulfur dioxide and ammonia. This procedure suffers from the disadvantage, however, that recovery of the desired lactam is dependent on the ammonium sulfate to sulfuric acid ratio employed, with truly satisfactory yields of separated lactam being obtained only at rather high salt to acid ratios. For example, the optimum yield of $\epsilon$-caprolactam with this procedure occurs at a molar ratio within the range of 1.6 to 2.0 moles of ammonium sulfate per mole of sulfuric acid. This means that after reaction, from about 0.6 to 1.0 moles of excess unreacted ammonium sulfate will be present in aqueous solution for each mole of ammonium bisulfate. The presence of unreacted sulfate is undesirable since it is wasteful, uneconomical and entails extra separatory and/or purification steps to recover the desired ammonium bisulfate for other uses.

I have discovered a superior procedure for the separation and recovery of lactams from the sulfur acid rearrangement mass. Additionally, my process produces essentially no ammonium sulfate neutral salt.

SUMMARY OF THE INVENTION

My process entails the addition to the rearrangement mass of:

a. ammonium sulfate in solid form which is transformed into the corresponding acid salt (ammonium bisulfate) on reaction with the sulfuric acid component of the rearrangement mass; and b. an aqueous solution of ammonium bisulfate, the corresponding acid salt of ammonium sulfate. The quantities of solid salt and acid salt solution and the temperature of reaction thereof with the rearrangement mass are all critical parameters of the instant process. High yields of recovered lactam are realized when employing a combination of controlled temperature and essentially equimolar amounts of ammonium sulfate relative to the sulfuric acid content of the rearrangement mass, thereby avoiding having large amounts of unreacted ammonium sulfate left in solution.

The water and ammonium bisulfate are recycled and hence the only net ingredient added is ammonium sulfate in an amount equimolar to the sulfuric acid present in the rearrangement mass. I have additionally found that chloroform has an unexpectedly high capacity for dissolving lactam when employed as an extraction solvent resulting in increased recovery of the lactam after its separation from the rearrangement mass.

DETAILED DESCRIPTION OF THE INVENTION

In the practice of the present process, an alicyclic oxime, preferably cyclohexanone oxime, is rearranged in known manner with oleum to afford the corresponding lactam. The resulting rearrangement mass, i.e. lactam in the conjugated acid form together with sulfuric acid, is then separated into a two-phase system by the addition to the rearrangement mass of an aqueous solution of ammonium bisulfate and, as a dry solid, ammonium sulfate in an amount sufficient to provide an equimolar ratio of ammonium sulfate to sulfuric acid. The dry ammonium sulphate and aqueous ammonium bisulfate can be added to the rearrangement mass either simultaneously which is preferable, or either one first. The reaction of rearrangement mass with ammonium sulfate and ammonium bisulfate is effected at a temperature above about 40° C. but not greater than about 90° C. Said lactam is thereby transformed into the free base form as a separate phase and is then recovered, preferably employing a water immiscible organic solvent which has a high capacity for dissolving said lactam, which solvent can also be added either prior to, simultaneously with or subsequent to the ammonium bisulfate and ammonium sulfate. Ammonium sulfate fulfills the solubility requirements of the instant process in that it is soluble in the reaction medium and forms an acid salt with sulfuric acid which acid salt is likewise soluble in the reaction medium. The reaction medium is thus seen to initially comprise rearrangement mass, water, ammonium bisulfate, ammonium sulfate, sulfuric acid and free lactam. The sulfuric acid and ammonium sulfate of course react together to form ammonium bisulfate. Thus, on completion of the reaction only water, free lactam and ammonium bisulfate would be present. In an optional preferred embodiment, water-immiscible organic solvent for the lactam would also be present, as heretofore indicated.

The parameters of temperature and the molar proportions of the reactants employed herein in separating the lactam from the rearrangement mass are essential to the successful operation of the instant invention. Operation of the instant process at temperatures above about 90° C. will result in the loss of some of the lactam through hydrolysis thereof to aminocaproic acid. The preferred reaction temperature will be about 60° to 80° C. Molar ratios of ammonium sulfate to sulfuric acid in excess of 1.1 to 1 are not employed in the instant process since they result in the presence of unreacted ammonium sulfate and offer no advantage in product yield under the instant process conditions. Conversely, ratios below 0.9 to 1 will result in a reduced recovery of lactam under the temperature limitations employed herein. Preferably, the mole ratio of ammonium sulfate to sulfuric acid will be as close to 1:1 as can reasonably be obtained in an industrial type process.

As hereinafter employed, the term about 1:1 as applied to the ammonium sulfate to sulfuric acid mole ratio shall connote a ratio ranging from about 0.9 to 1 to 1.1 to 1.

In the process of the instant invention, solid ammonium sulfate and an aqueous solution of ammonium bisulfate are added to the rearrangement mass in a first reaction zone, preferably in conjunction with a lactam extraction solvent. The ammonium sulfate in the presence of sulfuric acid and water reacts immediately to produce more ammonium bisulfate, which results in the formation of an amount sufficient to produce a saturated solution thereof at a temperature within the prescribed range of 40°–90° C.; for example, 60° C. This temperature, herein referred to as $T_1$, is that temperature at which the aqueous solution of ammonium bisulfate present with rearrangement mass becomes saturated upon the addition of the amount of ammonium sulfate necessary to provide an ammonium sulfate to sulfuric acid ratio of about 1:1. At this point, the separate phase containing lactam is removed from the aqueous bisulfate phase. The saturated aqueous solution of ammonium bisulfate is then cooled to a lower temperature within the range of 20°–55° C.; for example, 40° C., ordinarily in a second reaction zone, and this lower temperature, $T_2$, permits crystallization of a portion of the ammonium bisulfate due to a decrease in the solubility thereof at the lower temperature. The ammonium bisulfate which crystallizes out is removed and the resulting ammonium bisulfate aqueous solution, which is now saturated at $T_2$ but would be unsaturated at $T_1$, is recycled to the first reaction zone maintained at $T_1$ for reuse in a subsequent lactam separation procedure by addition of more rearrangement mass and ammonium sulfate, which of course reacts immediately with the sulfuric acid to form additional ammonium bisulfate. Although the operable ranges for $T_1$ and $T_2$ overlap, in any particular run $T_1$ must, of course, be higher than $T_2$.

The process of the instant invention is thus seen to comprise:

a. contacting, at a temperature in the range of 40° C. to 90° C., rearrangement mass comprising ε-caprolactam and sulfuric acid with i. solid ammonium sulfate in an amount ranging from about 0.9 to about 1.1 moles per mole of sulfuric acid present in the rearrangement mass, and ii. an aqueous ammonium bisulfate solution which is saturated at a temperature within the range 20° to 55° C., the amount of said aqueous solution being sufficient to dissolve the additional ammonium bisulfate formed by the reaction of the sulfuric acid component of the rearrangement mass with said ammonium sulfate at a temperature of 40° to 90° C. to thereby afford an ε-caprolactam phase and an aqueous ammonium bisulfate phase essentially saturated at 50°–90° C.

b. removing said ε-caprolactam phase.

c. cooling said aqueous ammonium bisulfate phase to a lower temperature within the range of 20°–55° C.

d. recovering the ammonium bisulfate which crystallizes out on said cooling to thereby afford an essentially saturated at 20°–55° C. aqueous solution of ammonium bisulfate, and e. recycling said saturated aqueous solution to step a).

This procedure is particularly advantageous and efficient since it avoids the costs of water evaporation and permits continuous reuse of the same ammonium bisulfate solution in a cyclic process. Thus, once the reaction has been started, only rearrangement mass and sufficient ammonium sulfate to neutralize the sulfuric acid in the rearrangement mass, and provide a saturated solution of ammonium bisulfate at $T_1$ need be added to the system, and sufficient water to make up any water removed in the ε-caprolactam phase. Recovery of the desired lactam is realized in high yield.

The comparative solubility of ammonium bisulfate at the temperatures in question is illustrated by the following table.

Solubility of ABS* in Water

| Temperature, °C. | Wt. % ABS in saturated solution |
|---|---|
| 30 | 76.1 |
| 40 | 79.7 |
| 50 | 82.4 |
| 60 | 85.2 |
| 70 | 87.0 |
| 80 | 89.2 |
| 90 | 91.5 |

*ABS = ammonium bisulfate

Recovery of the lactam after separation from the rearrangement mass is preferably effected, as above indicated, by extraction with one of the many known water-immiscible organic solvents which dissolves ε-caprolactam. The solvent is preferably added to the reaction vessel along with the rearrangement mass, ammonium sulfate and aqueous ammonium bisulfate and the resultant phase containing lactam and organic solvent removed from the aqueous ammonium bisulfate phase. If desired the ammonium bisulfate phase can be further extracted with additional solvent in a single or multi-stage process to remove all trace of ε-caprolactam therefrom. Suitable solvents include benzene, toluene, xylene, dichloroethane, trichloroethane, ethyl ether, dibutyl carbitol, chloroform, and the like. When a solvent is utilized an additional advantage is that no water is extracted into the ε-caprolactam phase and hence none need be added to the system as make up.

It has been discovered that chloroform has an unexpectedly high capacity to dissolve the lactam when employed as solvent and results in essentially quantitative recovery of lactam. This is particularly surprising since such extraordinary capacity to dissolve lactam is not shared by closely related solvents such as dichloro- and trichloroethylene. Chloroform is therefore an especially preferred solvent herein.

The invention is further illustrated by the examples which follow.

Preparation of Rearrangement Mass

Approximately 10 Kg. of rearrangement mass was obtained by reacting cyclohexanone oxime with oleum containing 3% $SO_3$. The rearrangement was effected by adding the oxime incrementally to the total required amount of oleum while maintaining the temperature at about 80° C.

Aliquots of this rearrangement mass were utilized in the recoveries of lactam reported in the Examples which follow.

EXAMPLE 1

A reaction vessel was equipped with a stirrer and a cooling bath. 13.45 parts of the rearrangement mass containing 7.18 parts sulfuric acid as prepared above were added to 75 parts chloroform solvent after which 96.6 parts of an aqueous solution of ammonium bisulfate were added thereto. 9.6 parts of solid ammonium bisulfate was then added to the contents of the vessel which was cooled so that the temperature of its contents was maintained at about 60° C. There thereby results a separation of ε-caprolactam in chloroform as an upper phase and a saturated solution of ammonium bisulfate as a lower phase. The phases were mixed for about three minutes after which the upper lactam/solvent phase was decanted and the aqueous phase then extracted twice with 75 parts each time of chloroform. The chloroform extracts were combined with the ε-caprolactam phase in a suitable vessel and the solution stripped to remove the chloroform. Recovery of the lactam was essentially quantitative.

The aqueous lower phase, a saturated solution of ammonium bisulfate at 60° C., was removed from the reaction vessel to a cooler maintained at a temperature of about 40° C. whereby 16.8 parts of ammonium bisulfate crystallized out, the supernatant solution, 96.6 parts of aqueous ammonium bisulfate, was returned to the reaction vessel and the foregoing process repeated using additional ammonium sulfate, chloroform and rearrangement mass.

EXAMPLE 2

The process of Example 1 was repeated except that only 50 parts of chloroform were initially added. After decantation of the chloroform/-caprolactam phase, the aqueous ammonium bisulfate phase was further extracted in a 4-stage counter-current extraction apparatus employed a 3/1 weight ratio of chloroform to bisulfate phase in each stage. All extracts were combined and the chloroform solvent stripped off affording an essentially quantitative yield of ε-caprolactam.

EXAMPLE 3

The procedure of Example 2 was followed except that in each run an equivalent weight of the indicated solvent was substituted for chloroform. Yields of recovered ε-caprolactam are tabulated below:

| Run No. | Solvent | Yield of —caprolactam, % |
|---|---|---|
| 1 | trichloroethylene | 92 |
| 2 | toluene | 74 |
| 3 | xylene | 70 |
| 4 | dichloroethane | 87 |

EXAMPLE 4

13.45 parts of rearrangement mass containing 7.18 parts $H_2SO_4$ was stirred at 60° C. together with 9.7 part solid ammonium sulfate and 96 parts of an ammonium bisulfate solution which is saturated with respect to both ammonium bisulfate and caprolactam at 40° C. Such a solution will contain about 79.7 percent by weight ammonium bisulfate. After agitation for 3 minutes, the mixture was allowed to settle forming two layers. The upper layer, amounting to 8.9 parts contains the caprolactam component of the rearrangement mass. The upper layer was decanted and distilled to afford pure caprolactam. The lower layer was cooled to 40° C. precipitating ammonium bisulfate crystals, amounting to 16.9 parts. The mother liquor at 40° C. was then recycled to react with more rearrangement mass. A small amount of water, i.e. about 2.3 parts was added to compensate for water removed with the crude lactam.

I claim:

1. A process comprising the steps of:
   a. contacting at a temperature ranging from about 40° C. to about 90° C. a rearrangement mass comprising ε-caprolactam and sulfuric acid with the following reactants:
      i. substantially water-free ammonium sulfate in an amount ranging from about 0.9 to about 1.1 moles per mole of sulfuric acid present in said rearrangement mass, and
      ii. an aqueous ammonium bisulfate solution saturated at a temperature within the range of 20° to 55° C., the amount of said aqueous solution being such as to dissolve at a temperature within the range of 40° to 90° C. the ammonium bisulfate formed by the reaction of the sulfuric acid component of the rearrangement mass with said ammonium sulfate, to thereby afford an ε-caprolactam phase and an aqueous ammonium bisulfate phase;
   b. separating said ε-caprolactam phase;
   c. cooling said aqueous ammonium bisulfate phase to a lower temperature within the range of 20° to 55° C. to thereby afford crystalline ammonium bisulfate and a saturated aqueous ammonium bisulfate solution;
   d. recovering and recycling said saturated aqueous solution to step a).

2. A process in accordance with claim 1 wherein said rearrangement mass is contacted with an additional reactant which is a water-immiscible organic solvent for ε-caprolactam.

3. A process in accordance with claim 2 wherein said solvent is chloroform.

4. A process in accordance with claim 2 wherein said aqueous ammonium bisulfate phase after separation of the ε-caprolactam phase and prior to said cooling is extracted at least once with a water-immiscible organic solvent for ε-caprolactam.

5. A process in accordance with claim 1 wherein said contacting temperature ranges from about 60° C. to about 80° C.

* * * * *